United States Patent
Minamisawa et al.

(10) Patent No.: US 9,116,361 B2
(45) Date of Patent: Aug. 25, 2015

(54) OPTICAL UNIT WITH SHAKE CORRECTING FUNCTION

(75) Inventors: Shinji Minamisawa, Nagano (JP); Shinroku Asakawa, Nagano (JP); Tatsuki Wade, Nagano (JP); Toshiyuki Karasawa, Nagano (JP); Hisahiro Ishihara, Nagano (JP)

(73) Assignee: NIDEC SANKYO CORPORATION (JP)

( * ) Notice: Subject to any disclaimer, the term of this patent is extended or adjusted under 35 U.S.C. 154(b) by 262 days.

(21) Appl. No.: 13/813,229

(22) PCT Filed: Jul. 22, 2011

(86) PCT No.: PCT/JP2011/066682
§ 371 (c)(1),
(2), (4) Date: Jan. 30, 2013

(87) PCT Pub. No.: WO2012/017839
PCT Pub. Date: Feb. 9, 2012

(65) Prior Publication Data
US 2013/0128360 A1    May 23, 2013

(30) Foreign Application Priority Data
Aug. 6, 2010 (JP) .................. 2010-177010

(51) Int. Cl.
*G02B 27/64* (2006.01)
*G03B 5/00* (2006.01)
*H04N 5/225* (2006.01)

(52) U.S. Cl.
CPC .............. *G02B 27/64* (2013.01); *G02B 27/646* (2013.01); *G03B 5/00* (2013.01); *H04N 5/2252* (2013.01); *G03B 2205/0023* (2013.01); *G03B 2205/0069* (2013.01)

(58) Field of Classification Search
CPC ..... G02B 27/646; G03B 5/00; H04N 5/23287
See application file for complete search history.

(56) References Cited

U.S. PATENT DOCUMENTS

2006/0285838 A1* 12/2006 Mashima et al. ............... 396/55
2011/0103782 A1* 5/2011 Tsuruta et al. .................. 396/55

FOREIGN PATENT DOCUMENTS

| JP | 2004-308914 A | 11/2004 |
| JP | 2006-126712 A | 5/2006 |
| JP | 2007-162895 A | 6/2007 |
| JP | 2009-288769 A | 12/2009 |
| JP | 2010-96862 A | 4/2010 |
| WO | 2010044199 A1 | 4/2010 |

OTHER PUBLICATIONS

International Search Report for International Application No. PCT/JP2011/066682, mailed Sep. 13, 2011, with English translation.

* cited by examiner

*Primary Examiner* — Joseph P Martinez
(74) *Attorney, Agent, or Firm* — Cantor Colburn LLP

(57) ABSTRACT

An optical unit may include a fixed body, a movable module which holds an optical element, a swing support point which swingably supports the movable module, and a shake correction drive mechanism structured to swing the movable module with the swing support point as a swing center. The swing support point may be structured of an abutted portion of two members in an optical axis direction between a bottom part of the movable module and a bottom part of the fixed body. At least one of the two members may be made of elastic material.

11 Claims, 12 Drawing Sheets

OPTICAL UNIT WITH SHAKE CORRECTING FUNCTION

TECHNICAL FIELD

The present invention relates to an optical unit with a shake correcting function which is mounted on a cell phone with a camera or the like.

CROSS REFERENCE TO RELATED APPLICATIONS

This is a U.S. national stage of International Application No. PCT/JP2011/0666682 filed on Jul. 22, 2011. Priority under 35 U.S.C. §119(a) and 35 U.S.C. §365(b) is claimed from Japanese Application No. 2010-177010, filed Aug. 8, 2010, the disclosure of which is also incorporated herein by reference.

BACKGROUND

In recent years, a cell phone is structured as an optical device on which an optical unit for photographing is mounted. In the optical unit, in order to restrain disturbance of a photographed image due to a shake in hand of a user, for example, as shown in FIG. 12(a), an elastic member 189a is fixed to both of a photographing unit 1 (movable module) and a fixed body 200 so that the photographing unit 1 is capable of being swung and, in this state, the photographing unit 1 is swung by a shake correction drive mechanism 500 to correct the shake (see Patent Literature 1). However, in the structure described in Patent Literature 1, when the photographing unit 1 is to be swung by the shake correction drive mechanism 500, since the elastic member 189a is required to be deformed, a large drive force is required and its responsiveness is low.

On the other hand, as a structure in which the photographing unit 1 is capable of swinging with respect to the fixed body 200, as shown in FIG. 12(b), a structure has been proposed in which a protruded part 189b is provided in the fixed body 200 and the protruded part 189b is abutted with a bottom part of the photographing unit 1 as a swing support point (see Patent Literature 2). According to this structure, only a small drive force is required and its responsiveness is enhanced. However, in the structure described in Patent Literature 2, when an impact is applied from the outside, the impact is concentrated on the swing support point and thus the photographing unit 1 or the fixed body 200 may be deformed.

On the other hand, as shown in FIG. 12(c), a structure has been proposed in which a plate spring part 189c is provided in the fixed body 200 and a protruded part 189b is provided on the plate spring part 189c (see Patent Literature 3). According to this structure, even when an impact which is applied from the outside is concentrated on the swing support point, the impact is absorbed by deformation of the plate spring part 189c and thus deformation of the photographing unit 1 or the fixed body 200 is prevented.

PATENT LITERATURE

[PTL 1] Japanese Patent Laid-Open No. 2006-126712
[PTL 2] Japanese Patent Laid-Open No. 2009-288769
[PTL 3] Japanese Patent Laid-Open No. 2010-96862

However, in the structure described in Patent Literature 3, when vibration is applied from the outside, the plate spring part 189c will resonate depending on its frequency and the photographing unit 1 will also resonate. As a result, image-pickuping by the photographing unit 1 is difficult. Further, in a case that a structure is adopted in which a relative positional relationship between the photographing unit 1 and the fixed body 200 is monitored and the shake correction drive mechanism 500 is controlled on the basis of the monitored result, when the plate spring part 189c resonates, the relative positional relationship between the photographing unit 1 and the fixed body 200 continues to be varied and thus the shake correction drive mechanism 500 is unable to be controlled.

SUMMARY

In view of the problem described above, at least an embodiment of the present invention provides an optical unit with a shake correcting function in which the movable module is capable of being swung by a small force and, even when the optical unit is structured to be capable of absorbing an impact, resonance of the movable module is prevented.

In order to attain the above benefits, at least an embodiment of the present invention provides an optical unit with a shake correcting function including a fixed body, a movable module which holds an optical element, a swing support point which swingably supports the movable module, and a shake correction drive mechanism structured to swing the movable module with the swing support point as a swing center. In the optical unit, the swing support point is structured of an abutted portion of two members in an optical axis direction between a bottom part of the movable module and a bottom part of the fixed body, and at least one of the two members is made of elastic material.

In the optical unit with a shake correcting function (optical unit) in accordance with at least an embodiment of the present invention, since the movable module is swingably supported by the fixed body, when a shake such as a shake in hand is occurred in the optical unit, the movable module is capable of being swung by the shake correction drive mechanism so as to cancel the shake. Therefore, even when the optical unit is shaken, the inclination of the optical axis can be corrected. Further, in order to structure the movable module so as to be capable of being swung, in at least an embodiment of the present invention, the swing support point is utilized which is structured of an abutted portion of two members in the optical axis direction between the bottom part of the movable module and the bottom part of the fixed body and thus, when the movable module is swung, the member structuring the swing support point is not required to be deformed. Therefore, the movable module is capable of being swung by a small force. In addition, in at least an embodiment of the present invention, at least one of the two members structuring the swing support point is made of elastic material and thus, when an impact is applied, the impact is absorbed by the member made of elastic material. Further, in a case that the member is made of elastic material, different from a spring, vibration energy is converted into thermal energy and absorbed. Therefore, resonance is hard to be occurred between the movable module and the fixed body.

In at least an embodiment of the present invention, it is preferable that a spring member is provided between the movable module and the fixed body for urging the movable module toward the bottom part of the fixed body. According to this structure, the movable module and the fixed body are set in a tightly abutted state and thus resonance of the movable module is prevented.

In at least an embodiment of the present invention, it is preferable that one of the two members is abutted with the other member through a portion which is curved in a projected shape. According to this structure, the movable module can be supported uniformly regardless of a swing direction of the movable module. Further, the impact can be absorbed effectively by the curved shape. Therefore, a structure may be adopted in which only one of the two members is made of elastic material.

In at least an embodiment of the present invention, a structure may be adopted in which a photo reflector is provided between the bottom part of the movable module and the bottom part of the fixed body for detecting displacement of the movable module with respect to the fixed body and the shake correction drive mechanism is controlled on the basis of a detection result of the reflector. According to at least an embodiment of the present invention, even when this structure is adopted, a state that a relative positional relationship between the photographing unit and the fixed body continues to vary by resonance is capable of being avoided and thus, the shake correction drive mechanism is controlled appropriately.

In at least an embodiment of the present invention, it is preferable that the optical unit includes a flexible circuit board which is connected with the movable module, the flexible circuit board is provided with a folded-back portion which is turned around at the same height position in the optical axis direction as a swing center of the movable module in the swing support point between the bottom part of the movable module and the bottom part of the fixed body. According to this structure, when the movable module is swung, displacement of the folded-back portion of the flexible circuit board is small. Therefore, a resistance force generated by the flexible circuit board is small when the movable module is swung and thus the movable module can be swung smoothly.

In the optical unit with a shake correcting function (optical unit) in accordance with at least an embodiment of the present invention, in order to structure the movable module so as to be capable of being swing, the swing support point is utilized which is structured of an abutted portion of two members in the optical axis direction between the bottom part of the movable module and the bottom part of the fixed body and thus, when the movable module is swung, the member structuring the swing support point is not required to be deformed. Therefore, the movable module can be swung by a small force. In addition, in at least an embodiment of the present invention, at least one of the two members structuring the swing support point is made of elastic material and thus, when an impact is applied, the impact is absorbed by the member made of elastic material. Further, in a case that the member is made of elastic material, different from a spring, vibration energy is converted into thermal energy and absorbed. Therefore, resonance is hard to be occurred between the movable module and the fixed body.

Accordingly, a state that a relative positional relationship between the movable module and the fixed body continues to vary by resonance is capable of being avoided and thus, in a case that a servo control is performed, even when a control gain is increased, the control system is prevented from being oscillated. For example, even in a case that displacement of the movable module is detected by a photo reflector between the bottom part of the movable module and the bottom part of the fixed body and the shake correction drive mechanism is controlled on the basis of the detection result, the shake correction drive mechanism can be controlled appropriately.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DESCRIPTION OF EMBODIMENTS

Embodiments to which the present invention is applied will be described below with reference to the accompanying drawings. In the following descriptions, embodiments of the present invention are schematically described with reference to FIGS. 1(a) through 3(b) and then, a specific structure example will be described.

[First Embodiment]

Figure 1A:
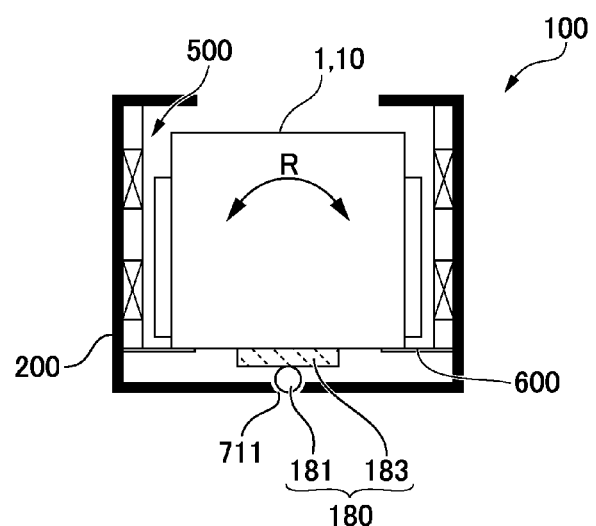
FIGS. 1(a) and 1(b) are explanatory views schematically showing a structure of an optical unit with a shake correcting function in accordance with a first embodiment of the present invention.
Figure 1B:
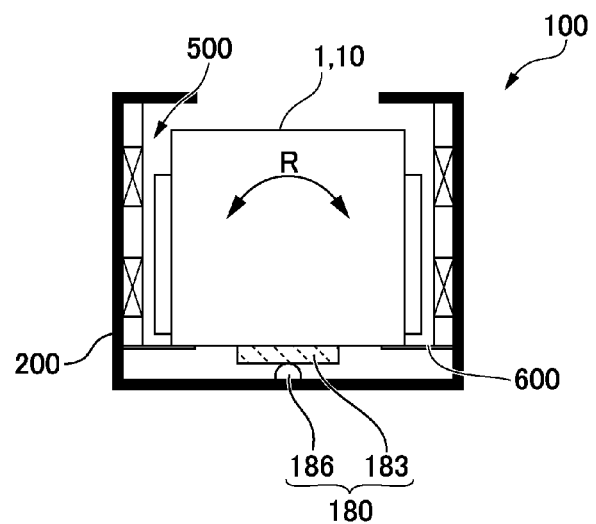

FIGS. 1(a) and 1(b) are explanatory views schematically showing a structure of an optical unit with a shake correcting function in accordance with a first embodiment of the present invention. FIG. 1(a) is an explanatory view showing an optical unit in which a swing support point is structured of a support plate of a movable module and a steel ball, and FIG. 1(b) is an explanatory view showing an optical unit in which a swing support point is structured of a support plate of a movable module and a hemispherical protruded part of a fixed body.

In FIG. 1(a), an optical unit 100 with a shake correcting function in accordance with the first embodiment includes a fixed body 200, a movable module 10 (photographing unit 1) which holds optical elements such as a lens and an imaging element, a swing support point 180 which swingably supports the movable module 10, and a shake correction drive mechanism 500 structured to swing the movable module 10 with the swing support point 180 as a swing center. A spring member 600 which urges the movable module 10 toward a bottom part of the fixed body 200 is provided between the movable module 10 and the fixed body 200 and the members structuring the swing support point 180 are set in a tightly abutted state.

In the optical unit 100, when a shake such as a shake in hand is occurred in the optical unit 100, the shake is detected by a sensor (not shown) and the shake correction drive mechanism 500 is controlled on the basis of a detection result of the sensor. As a result, the shake correction drive mechanism 500 swings the movable module 10 with the swing support point 180 as a swing center as shown by the arrow "R" and, in this manner, the shake of the movable module 10 due to the shake of the optical unit 100 is corrected.

In this embodiment, the swing support point 180 is structured of an abutted portion of two members in an optical axis direction between a bottom part of the movable module 10 and a bottom part of the fixed body 200 and is provided with a similar structure to a pivot bearing. More specifically, a hole 711 is formed in the bottom part of the fixed body 200 and a steel ball 181 (spherical body) is held by the hole 711. A portion curved in a projected shape of the steel ball 181 is abutted with the bottom part of the movable module 10 and the movable module 10 is capable of being swung with the abutted portion of the movable module 10 with the steel ball 181 as a supporting point. In this embodiment, the bottom part of the movable module 10 is comprised of a support plate 183 which is adhesively fixed to a movable module main body and the swing support point 180 is structured of the support plate 183 and the steel ball 181.

Further, in the optical unit 100 in this embodiment in which the swing support point 180 is structured of two members (support plate 183 and steel ball 181), the support plate 183 is made of elastic material such as rubber or porous elastomer (rubber or resin).

In the optical unit 100 with a shake correcting function structured as described above, the swing support point 180 is utilized which is structured of the abutted portion of two members (support plate 183 and steel ball 181) which are abutted in the optical axis direction between the bottom part of the movable module 10 and the bottom part of the fixed body 200. Therefore, when the movable module 10 is swung, the member structuring the swing support point 180 is not required to be deformed. Accordingly, the movable module 10 is swung by a small force.

Further, in this embodiment, in the two members (support plate 183 and steel ball 181) which structure the swing support point 180, the support plate 183 is made of elastic material and thus, when an impact is applied, the impact can be absorbed by the support plate 183 which is made of elastic material. Further, in a case that the member (support plate 183) is made of elastic material, different from a spring, vibration energy is converted into thermal energy and absorbed. Therefore, resonance is hard to be occurred between the movable module 10 and the fixed body 200. Accordingly, a state that a relative positional relationship between the movable module 10 and the fixed body 200 continues to vary by the resonance is capable of being avoided and thus, in a case that a servo control is performed, even when a control gain is increased, the control system is prevented from being oscillated. For example, even when displacement of the movable module 10 is detected by a photo reflector (not shown) between the bottom part of the movable module 10 and the bottom part of the fixed body 200 and the shake correction drive mechanism 500 is controlled on the basis of the detection result, the shake correction drive mechanism 500 is controlled appropriately.

Further, a portion which is curved in a projected shape of one (steel ball 181) of two members (support plate 183 and steel ball 181) structuring the swing support point 180 is abutted with the other member (support plate 183). Therefore, the swing support point 180 uniformly supports the movable module 3 regardless of a direction that the movable module 3 is swung. Further, a curved shape effectively absorbs an impact in comparison with an acute angle shape and thus a structure is adopted in which only one of the two members (support plate 183 and steel ball 181) is made of elastic material. In accordance with an embodiment of the present invention, both of two members (support plate 183 and steel ball 181) structuring the swing support point 180 may be structured of elastic material.

Further, a spring member 600 which urges the movable module 10 toward the bottom part of the fixed body 200 is provided between the movable module 10 and the fixed body 200. Therefore, the movable module 10 and the fixed body 200 are set in a tightly contacted state and thus the resonance of the movable module 10 is prevented.

In the embodiment shown in FIG. 1(a), the swing support point 180 is structured of the support plate 183 of the movable module 10 and the steel ball 181 located on the bottom part side of the fixed body 200. However, as shown in FIG. 1(b), the swing support point 180 may be structured of a protruded part 186, which is protruded from the bottom part of the fixed body 200 so that its tip end part is formed in a curved shape toward the movable module 10, and the support plate 183.

Also in this structure, the swing support point 180 is structured of an abutted portion of two members (support plate 183 and protruded part 186) which are abutted in the optical axis direction between the bottom part of the movable module 10 and the bottom part of the fixed body 200. Therefore, when the movable module 10 is swung, the member structuring the swing support point 180 is not required to be deformed. Accordingly, the movable module 10 is swung by a small force. Further, in this embodiment, in the two members (support plate 183 and protruded part 186) structuring the swing support point 180, the support plate 183 is made of elastic material and thus, when an impact is applied, the impact can be absorbed by the support plate 183 which is made of elastic material. Accordingly, resonance is hard to be occurred between the movable module 10 and the fixed body 200.

[Second Embodiment]

Figure 2A:
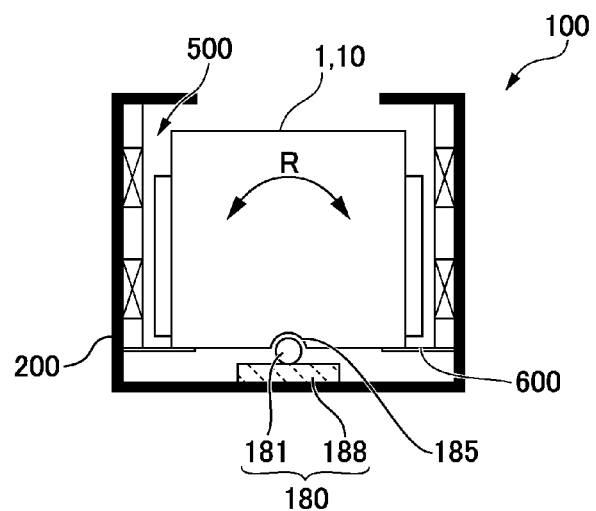
FIGS. 2(a) and 2(b) are explanatory views schematically showing a structure of an optical unit with a shake correcting function in accordance with a second embodiment of the present invention.
Figure 2B:
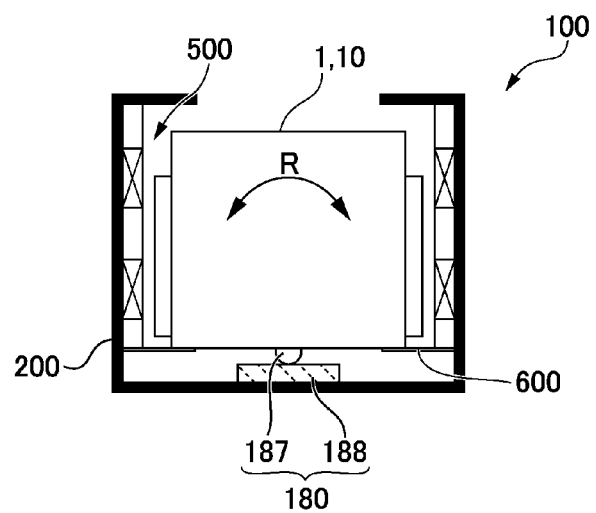

FIGS. 2(a) and 2(b) are explanatory views schematically showing a structure of an optical unit with a shake correcting function in accordance with a second embodiment of the present invention. FIG. 2(a) is an explanatory view showing an optical unit in which a swing support point is structured of a support plate of the fixed body and a steel ball, and FIG. 2(b) is an explanatory view showing an optical unit in which a swing support point is structured of a support plate of the fixed body and a hemispherical protruded part of the movable module. Basic structures of the second embodiment and the following embodiment are similar to the first embodiment and thus the same reference signs are used for the common portions and their descriptions are omitted.

In FIG. 2(a), an optical unit 100 with a shake correcting function in accordance with the second embodiment, similarly to the first embodiment, also includes a fixed body 200, a movable module 10 (photographing unit 1) which holds optical elements such as a lens and an imaging element, a swing support point 180 which swingably supports the movable module 10, and a shake correction drive mechanism 500 structured to swing the movable module 10 with the swing support point 180 as a swing center. In the optical unit 100, when a shake such as a shake in hand is occurred in the optical unit 100, the shake is detected by a sensor (not shown) and the shake correction drive mechanism 500 is controlled on the basis of a detection result of the sensor to swing the movable module 10 with the swing support point 180 as a swing center.

In this embodiment, the swing support point 180 is structured of an abutted portion of two members in the optical axis direction between the bottom part of the movable module 10 and the bottom part of the fixed body 200. More specifically, a hole 185 is formed in the bottom part of the movable module 10 and the steel ball 181 is held by the hole 185. A portion of the steel ball 181 which is curved in a projected shape is abutted with the bottom part of the fixed body 200 and the movable module 10 is capable of being swung with the abutted portion of the steel ball 181 with the bottom part of the fixed body 200 as a supporting point. In this embodiment, the bottom part of the fixed body 200 is structured of a support plate 188 which is adhesively fixed to a fixed body main body, and the swing support point 180 is structured of the support plate 188 and the steel ball 181.

Further, in the optical unit 100 in this embodiment in which the swing support point 180 is structured of two members (support plate 188 and steel ball 181) which are abutted with each other, the support plate 188 is made of elastic material such as rubber or porous elastomer (rubber or resin).

Therefore, also in the optical unit 100 with a shake correcting function in this embodiment, similarly to the first embodiment, the swing support point 180 is utilized which is structured of the abutted portion of two members (support plate 188 and steel ball 181) abutted in the optical axis direction between the bottom part of the movable module 10 and the bottom part of the fixed body 200. Therefore, when the movable module 10 is swung, the member structuring the swing support point 180 is not required to be deformed. As a result, the movable module 10 is swung by a small force. Further, in this embodiment, in the two members (support plate 188 and steel ball 181) which structure the swing support point 180, the support plate 188 is made of elastic material and thus, when an impact is applied, the impact can be absorbed by the support plate 188 which is made of elastic material. Further, in a case that the member (support plate 188) is made of elastic material, different from a spring, vibration energy is converted into thermal energy and absorbed. Therefore, resonance is hard to be occurred between the movable module 10 and the fixed body 200.

Further, a portion which is curved in a projected shape of one (steel ball 181) of two members (support plate 188 and steel ball 181) structuring the swing support point 180 is abutted with the other member (support plate 188). Therefore, the swing support point 180 uniformly supports the movable module 3 regardless of a direction that the movable module 3 is swung. Further, a curved shape effectively absorbs an impact in comparison with an acute angle shape and thus the similar effects to the first embodiment can be attained, for example, a structure is adopted in which only one of the two members (support plate 188 and steel ball 181) is made of elastic material.

In the embodiment shown in FIG. 2(a), the swing support point 180 is structured of the support plate 188 of the fixed body 200 and the steel ball 181 located at a bottom part of the movable module 10. However, as shown in FIG. 2(b), the swing support point 180 may be structured of the support plate 188 and a protruded part 187 having a curved tip end part which is protruded from the bottom part of the movable module 10 toward the fixed body 200.

Also in this structure, the swing support point 180 is utilized which is structured of the abutted portion of two members (support plate 188 and protruded part 187) abutted in the optical axis direction between the bottom part of the movable module 10 and the bottom part of the fixed body 200. Therefore, when the movable module 10 is swung, the member structuring the swing support point 180 is not required to be deformed. Accordingly, the movable module 10 is swung by a small force. Further, in this embodiment, in the two members (support plate 188 and protruded part 187) which structure the swing support point 180, the support plate 188 is made of elastic material and thus, when an impact is applied, the impact can be absorbed by the support plate 188 which is made of elastic material. Further, in a case that the member (support plate 188) is made of elastic material, different from a spring, vibration energy is converted into thermal energy and absorbed. Therefore, the similar effects to the first embodiment are attained, for example, resonance is hard to be occurred between the movable module 10 and the fixed body 200.

[Third Embodiment]

Figure 3A:
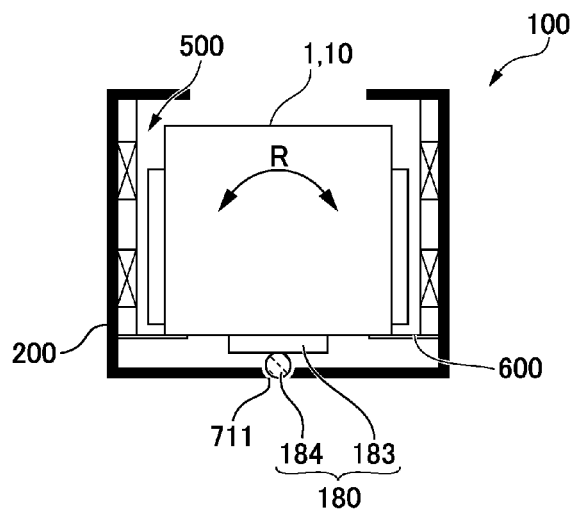
FIGS. 3(a) and 3(b) are explanatory views schematically showing a structure of an optical unit with a shake correcting function in accordance with a third embodiment of the present invention.
Figure 3B:
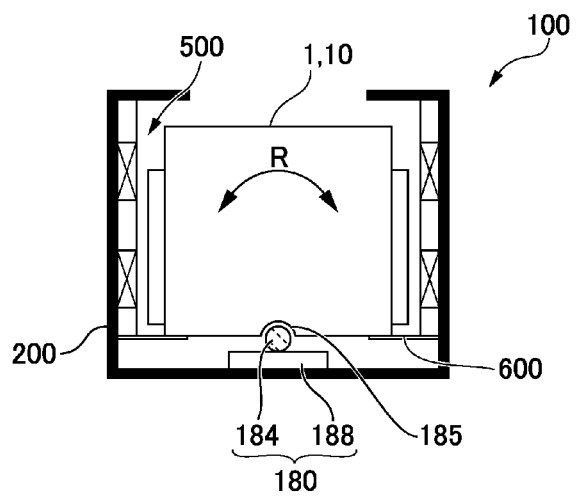

FIGS. 3(a) and 3(b) are explanatory views schematically showing a structure of an optical unit with a shake correcting function in accordance with a third embodiment of the present invention. FIG. 3(a) is an explanatory view showing an optical unit in which a swing support point is structured of a support plate of the movable module and a spherical body, and FIG. 3(b) is an explanatory view showing an optical unit in which a swing support point is structured of a support plate of the fixed body and a spherical body.

In FIG. 3(a), similarly to the embodiment which is described with reference to FIG. 1(a), a swing support point 180 of the optical unit 100 with a shake correcting function in this embodiment is also structured of an abutted portion of two members which are abutted in the optical axis direction between the bottom part of the movable module 10 and the bottom part of the fixed body 200. More specifically, a hole 711 is formed in the bottom part of the fixed body 200 and a spherical body 184 is held by the hole 711. A portion of the spherical body 184 which is curved in a projected shape is abutted with the bottom part of the movable module 10 and the movable module 10 is capable of being swung with the abutted portion of the movable module 10 with the spherical body 184 as a supporting point. In this embodiment, the bottom part of the movable module 10 is structured of the support plate 183 which is adhesively fixed to the movable module main body and the swing support point 180 is structured of the support plate 183 and the spherical body 184.

In this embodiment, the support plate 183 is a rigid board such as a metal plate and the spherical body 184 is made of elastic material such as rubber or porous elastomer (rubber or resin). Therefore, when an impact is applied, the impact can be absorbed by the spherical body 184 which is made of elastic material. Further, in a case that the member (spherical body 184) is made of elastic material, different from a spring, vibration energy is converted into thermal energy and absorbed. Therefore, the similar effects to the first embodiment are attained, for example, resonance is hard to be occurred between the movable module 10 and the fixed body 200.

In the embodiment shown in FIG. 3(*a*), the swing support point 180 is structured of the support plate 183 of the movable module 10 and the spherical body 184 which is made of elastic material. However, as shown in FIG. 3(*b*), the swing support point 180 may be structured of a support plate 188 (rigid board) of the fixed body 200 and a spherical body 184 which is made of elastic material.

[Example of Specific Structure of First Embodiment]

In the following description, an example of a structure for preventing a shake in hand in the photographing unit 1 as the movable module 10 will be described. Further, in the following description, three directions perpendicular to each other are set to be an "X"-axis, a "Y"-axis and a "Z"-axis and a direction along an optical axis "L" (lens optical axis) is set to be the "Z"-axis. Further, in the following description, regarding swings of the respective directions, turning around the "X"-axis corresponds to a so-called pitching (vertical swing), turning around the "Y"-axis corresponds to a so-called yawing (lateral swing), and turning around the "Z"-axis corresponds to a so-called rolling. Further, "+X" is indicated on one side of the "X"-axis, "-X" is indicated on the other side, "+Y" is indicated on one side of the "Y"-axis, "-Y" is indicated on the other side, "+Z" is indicated on one side (opposite side to an object side) of the "Z"-axis, and "-Z" is indicated on the other side (object side). The embodiment which will be described below corresponds to the embodiment described with reference to FIG. 1(*a*). However, the structures described with reference to FIG. 1(*b*), FIGS. 2(*a*) and 2(*b*), and FIGS. 3(*a*) and 3(*b*) are also structured in a substantially similar manner.

(Entire Structure of Optical Unit for Photographing)

Figure 4:
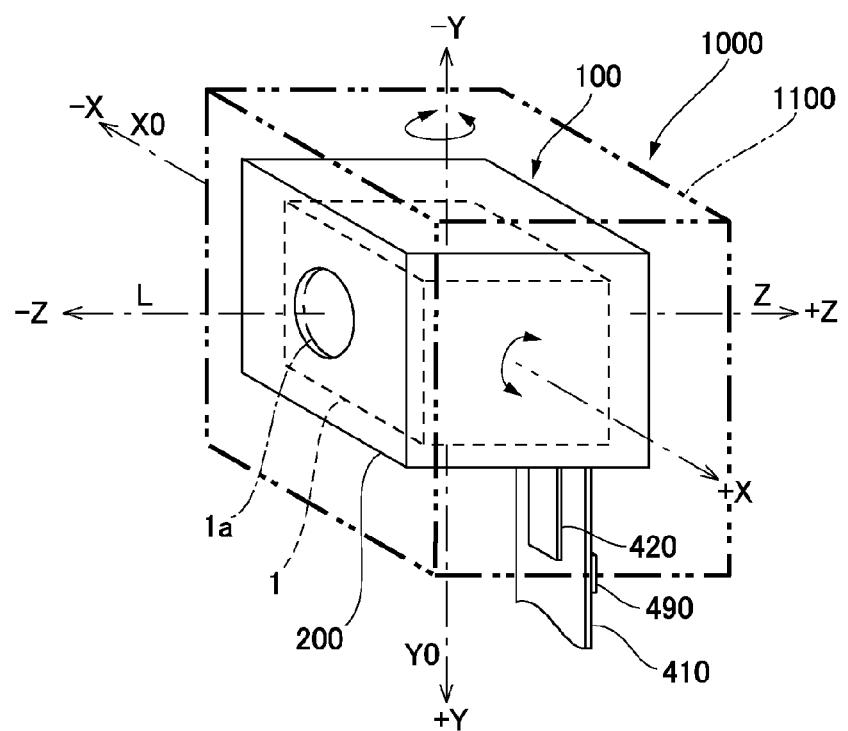
FIG. 4 is an explanatory view schematically showing a state in which the optical unit with a shake correcting function in accordance with the first embodiment of the present invention is mounted on an optical device such as a cell phone.
Figure 5A:
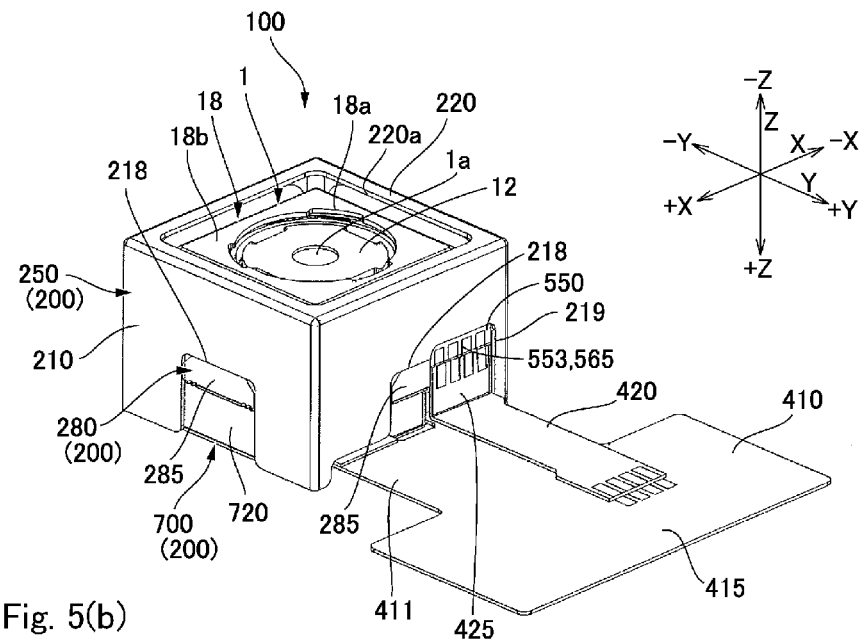
FIGS. 5(a) and 5(b) are perspective views showing an outward appearance and the like of the optical unit with a shake correcting function in accordance with the first embodiment of the present invention.
Figure 5B:
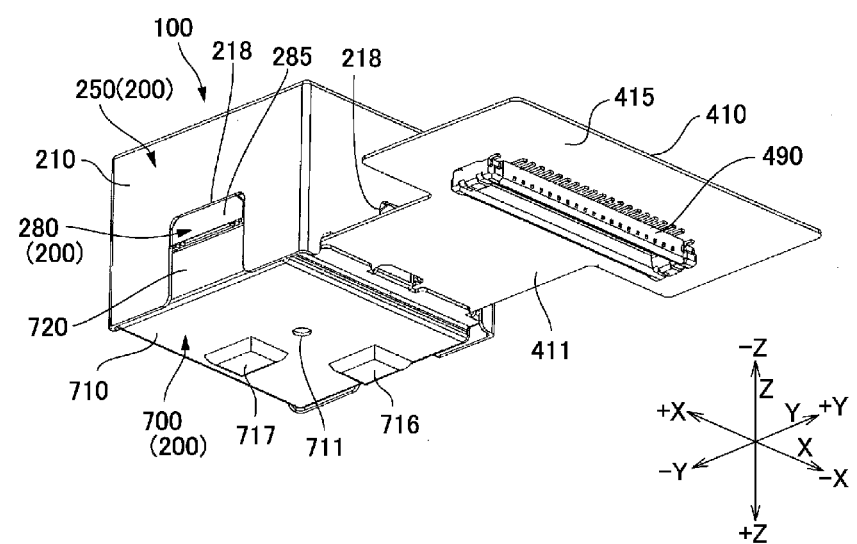

FIG. 4 is an explanatory view schematically showing a state in which an optical unit with a shake correcting function in accordance with the first embodiment of the present invention is mounted on an optical device such as a cell phone. FIGS. 5(*a*) and 5(*b*) are perspective views showing an outward appearance of an optical unit with a shake correcting function and the like in accordance with the first embodiment of the present invention. FIG. 5(*a*) is a perspective view showing the optical unit which is viewed from an object side and FIG. 5(*b*) is a perspective view showing the optical unit which is viewed from an opposite side to the object side.

An optical unit 100 (optical unit with a shake correcting function) shown in FIG. 4 is a thin camera which is used in an optical device 1000 such as a cell phone with a camera and is mounted in a supported state by a chassis 1100 (device main body) of the optical device 1000. In the optical unit 100, when a shake such as a shake in hand is occurred in the optical device 1000 at the time of photographing, disturbance occurs in a photographed image. Therefore, in the optical unit 100 in this embodiment, as described below, a movable body 3, i.e., the photographing unit 1 is supported within a fixed body 200 so as to be capable of being swung and the optical unit 100 is provided with a shake correction drive mechanism (not shown in FIG. 4) which swings the photographing unit 1 on the basis of a detection result for a shake in hand by a gyroscope (not shown) mounted on the optical unit 100 or a gyroscope (not shown) mounted on a main body side of the optical device 1000.

As shown in FIG. 4 and FIGS. 5(*a*) and 5(*b*), flexible circuit boards 410 and 420 are extended out from the optical unit 100 for supplying power to the photographing unit 1 and the shake correction drive mechanism. The flexible circuit boards 410 and 420 are electrically connected with a host control section or the like which is provided in a main body of the optical device 1000 through a common connector 490 or the like. Further, the flexible circuit board 410 is also provided with a function for outputting a signal from the photographing unit 1. Therefore, the number of wiring lines in the flexible circuit board 410 is large and thus a relatively wide flexible circuit board 410 is used.

(Structure of Photographing Unit 1)

Figure 6:
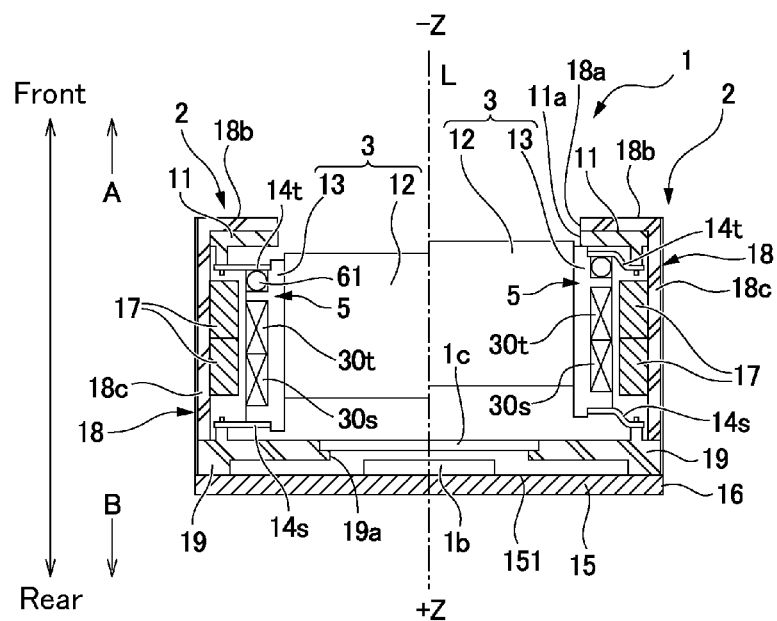
FIG. 6 is a cross-sectional view schematically showing a structure of a photographing unit which is mounted on the optical unit with a shake correcting function in accordance with the first embodiment of the present invention.
Figure 7:
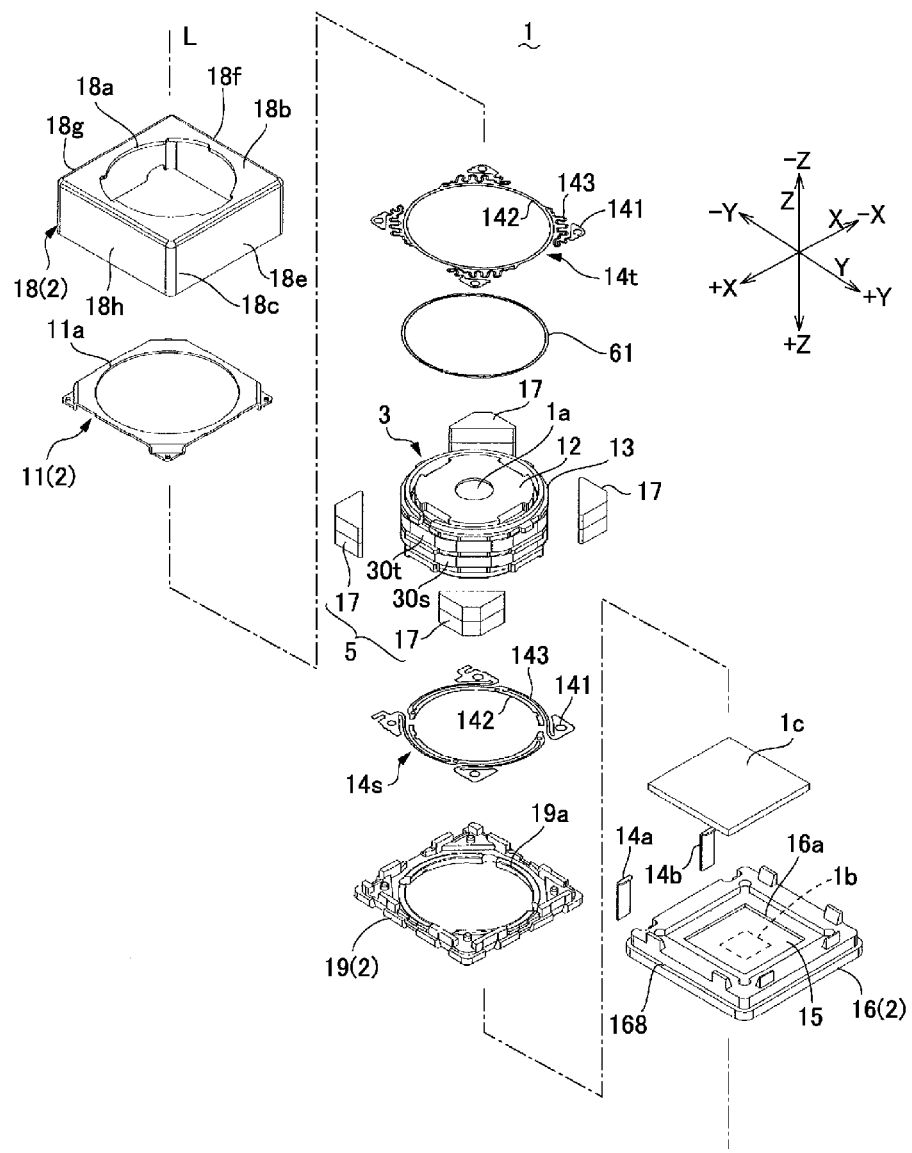
FIG. 7 is an exploded perspective view showing a photographing unit which is mounted on the optical unit with a shake correcting function in accordance with the first embodiment of the present invention.

FIG. 6 is a cross-sectional view schematically showing a structure of the photographing unit 1 which is mounted on the optical unit 100 with a shake correcting function in accordance with the first embodiment of the present invention. FIG. 7 is an exploded perspective view showing the photographing unit 1 which is mounted on the optical unit 100 with a shake correcting function in accordance with the first embodiment of the present invention.

As shown in FIGS. 6 and 7, the photographing unit 1 is, for example, an optical element unit which moves a plurality of lenses 1*a* as an optical element (see FIG. 4) in both directions, i.e., in an "A"-direction (front side) approaching an object to be photographed (object side) along a direction of the optical axis "L" and in a "B"-direction (rear side) approaching an opposite side (imaging element side/image side) to the object to be photographed. The photographing unit 1 is formed in a substantially rectangular prism shape. The photographing unit 1 generally includes a movable body 3 which holds optical elements such as a plurality of the lenses 1*a* (see FIG. 4) and a fixed diaphragm on its inner side, a lens drive mechanism 5 for moving the movable body 3 along an optical axis "L" direction, and a support body 2 on which the lens drive mechanism 5, the movable body 3 and the like are mounted. The movable body 3 is provided with a lens holder 12 in a cylindrical tube shape which holds the lenses 1*a* and the fixed diaphragm (not shown) and a coil holder 13 which holds the lens holder 12 on its inner side. Lens drive coils 30*s* and 30*t* structuring the lens drive mechanism 5 are held on an outer peripheral side face of the coil holder 13.

The support body 2 includes a spring holder 19 which holds a spring described below on an opposite side to an object side ("-Z" side), a board holder 16 in a rectangular plate shape which positions a mounting board 15 on an opposite side to the object side ("-Z" side) with respect to the spring holder 19, a case 18 in a box shape which is fitted to the spring holder 19 from the object side, and a spacer 11 in a rectangular plate shape which is disposed on an inner side of the case 18. An imaging element lb is mounted on a circuit board face of the mounting board 15 which is directed to the object side. Further, a filter 1*c* such as an infrared filter is held by the spring holder 19. Incident windows 11*a* and 18*a* for taking light from an object to be photographed into the lenses 1*a* are respectively formed at the centers of the spacer 11 and the case 18. Further, windows 16*a* and 19*a* for guiding the incident light to the imaging element lb are formed at the centers of the board holder 16 and the spring holder 19.

The case 18 is made of a ferromagnetic plate such as a steel plate and functions as a yoke. Therefore, the case 18 structures an interlinkage magnetic field generating body together with lens drive magnets 17 described below for generating a magnetic field interlinking with the lens drive coils 30*s* and 30*t*. The interlinkage magnetic field generating body structures the lens drive mechanism 5 together with the lens drive coils 30*s* and 30*t* which are wound around an outer peripheral face of the coil holder 13.

The support body 2 and the movable body 3 are connected with each other through metal spring members 14*s* and 14*t* which are disposed at separated positions in the optical axis direction. In this embodiment, the spring member 14*s* is used on the imaging element 1b side and the spring member 14t is used on an object to be photographed side. Basic structures of the spring members 14s and 14t are similar to each other and each of the spring members 14s and 14t is provided with an outer peripheral side connecting part 141 which is held by the support body 2, a circular ring-shaped inner peripheral side connecting part 142 which is held by the movable body 3, and arm parts 143 having a thinner width which are connected with the outer peripheral side connecting part 141 and the inner peripheral side connecting part 142. The outer peripheral side connecting part 141 of the spring member 14s on the imaging element 1b side is held by the spring holder 19 and its inner peripheral side connecting part 142 is connected with an imaging element side end part of the coil holder 13 of the movable body 3. The arm part 143 of the spring member 14s is extended in a circular arc shape in a circumferential direction. The outer peripheral side connecting part 141 of the spring member 14t on the object side is held by the spacer 11 and its inner peripheral side connecting part 142 is connected with an object side end part of the coil holder 13 of the movable body 3. The arm part 143 of the spring member 14t is extended in a circular arc shape in the circumferential direction while meandering in a radial direction. In this manner, the movable body 3 is supported by the support body 2 through the spring members 14s and 14t so as to be movable in the direction of the optical axis. Each of the spring members 14s and 14t is made of nonmagnetic metal such as beryllium copper or nonmagnetic SUS steel material and is formed by performing press working or etching processing using photo lithography technique on a thin plate having a certain thickness. The spring member 14s is divided into two spring pieces and respective coil ends of the lens drive coils 30s and 30t are connected with the respective spring pieces. Further, two spring pieces of the spring member 14s are connected with terminals 14a and 14b and thus the spring member 14s also functions as a power supply member for the lens drive coils 30s and 30t.

A ring-shaped magnetic piece 61 is held at an object side end part of the coil holder 13 and the position of the magnetic piece 61 is held at a position on the object side with respect to the lens drive magnets 17. Therefore, the magnetic piece 61 applies an urging force in the direction of the optical axis "L" to the movable body 3 by an attraction force acted between the lens drive magnets 17 and the magnetic piece 61. Accordingly, at a non-energization time (home position), the lens holder 12 is set stationary on the imaging element 1b side by the attraction force between the lens drive magnets 17 and the magnetic piece 61. Further, the magnetic piece 61 acts as a yoke and thus a leakage flux from a magnetic path structured between the lens drive magnets 17 and the lens drive coils 30s and 30t can be reduced. The magnetic piece 61 may be formed in a bar shaped magnetic body or a spherical shaped magnetic body. In a case that the magnetic piece 61 is formed in a ring shape, when the lens holder 12 is to be moved in the optical axis direction, an attraction force acted between the lens drive magnets 17 and the magnetic piece 61 becomes isotropic. In addition, at the time of energization to the lens drive coils 30s and 30t, the magnetic piece 61 is moved in a direction separated from the lens drive magnets 17 and thus an unnecessary force pressing the lens holder 12 to the imaging element 1b side may not act. Therefore, the lens holder 12 can be moved in the optical axis direction with small electric power.

In the photographing unit 1 in this embodiment, when viewed in the direction of the optical axis "L", the lens 1a (see FIG. 1) is formed in a circular shape but the case 18 used in the support body 2 is formed in a rectangular box shape. Therefore, the case 18 is provided with a rectangular tube-shaped body part 18c and an upper plate part 18b formed with the incident window 18a is provided on an upper face side of the rectangular tube-shaped body part 18c. The lens drive magnets 17 are fixed to inner side face parts corresponding to the corners of a quadrangle of the rectangular tube-shaped body part 18c and the lens drive magnets 17 are respectively comprised of a triangular prism-shaped permanent magnet. Each of four lens drive magnets 17 is divided into two pieces in the direction of the optical axis and is magnetized so that a magnetic pole of its inner face and a magnetic pole of its outer face are different from each other. Therefore, winding directions of the two lens drive coils 30s and 30t around the coil holder 13 are opposite to each other. The movable body 3 which is structured as described above is disposed on an inner side of the case 18. As a result, the lens drive coils 30s and 30t respectively face the lens drive magnets 17 which are fixed to the inner face of the rectangular tube-shaped body part 18c of the case 18 to structure the lens drive mechanism 5.

In the photographing unit 1 structured as described above, the movable body 3 is normally located on the imaging element side (one side in the "Z"-axis direction) and, in this state, when an electric current is supplied to the lens drive coils 30s and 30t in a predetermined direction, an electro-magnetic force directing to the object side (the other side in the "Z"-axis direction) is applied to the respective lens drive coils 30s and 30t. Therefore, the movable body 3 to which the lens drive coils 30s and 30t are fixed begins to move to the object side (front side). In this case, an elastic force restricting movement of the movable body 3 is generated between the spring member 14t and the front end of the movable body 3 and between the spring member 14s and the rear end of the movable body 3. Therefore, when the electro-magnetic force for moving the movable body 3 to the front side and the elastic force for restricting the movement of the movable body 3 are balanced with each other, the movable body 3 is stopped. In this case, when an amount of an electric current supplied to the lens drive coils 30s and 30t is adjusted depending on the elastic force acting on the movable body 3 by the spring members 14s and 14t, the movable body 3 can be stopped at a desired position.

(Structure of Optical Unit 100)

Figure 8A:
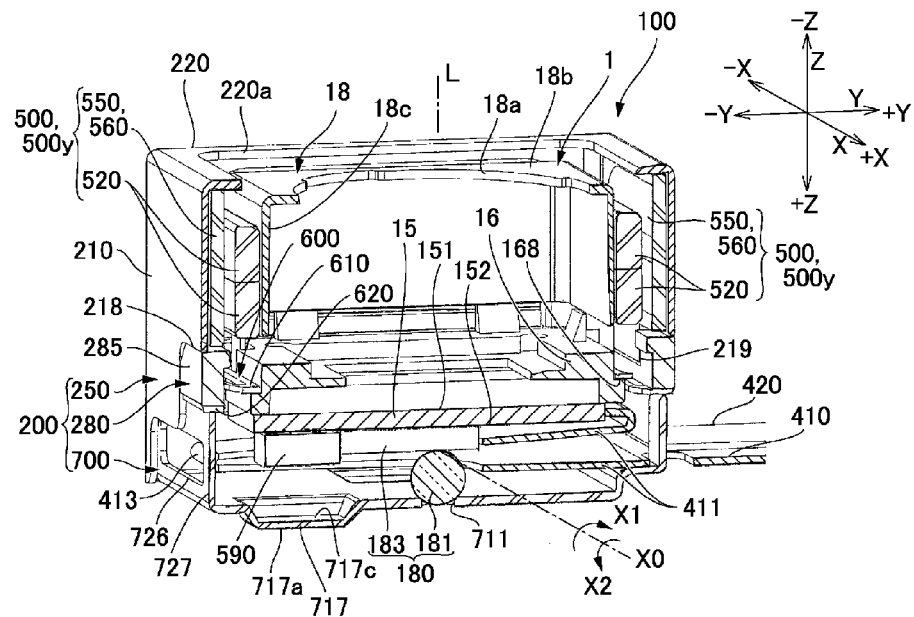
FIGS. 8(a) and 8(b) are cross-sectional views showing an internal structure of the optical unit with a shake correcting function in accordance with the first embodiment of the present invention.
Figure 8B:
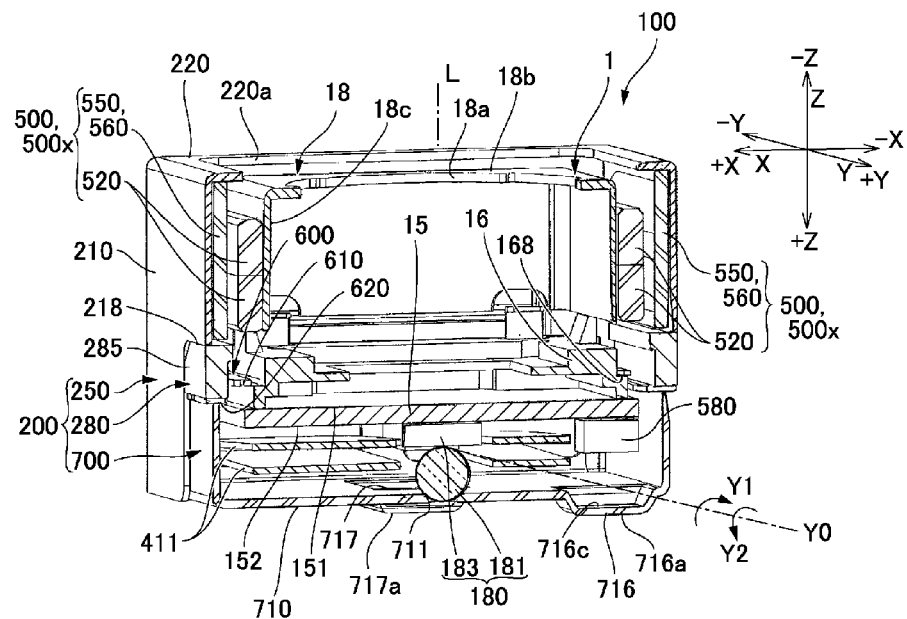
Figure 9:
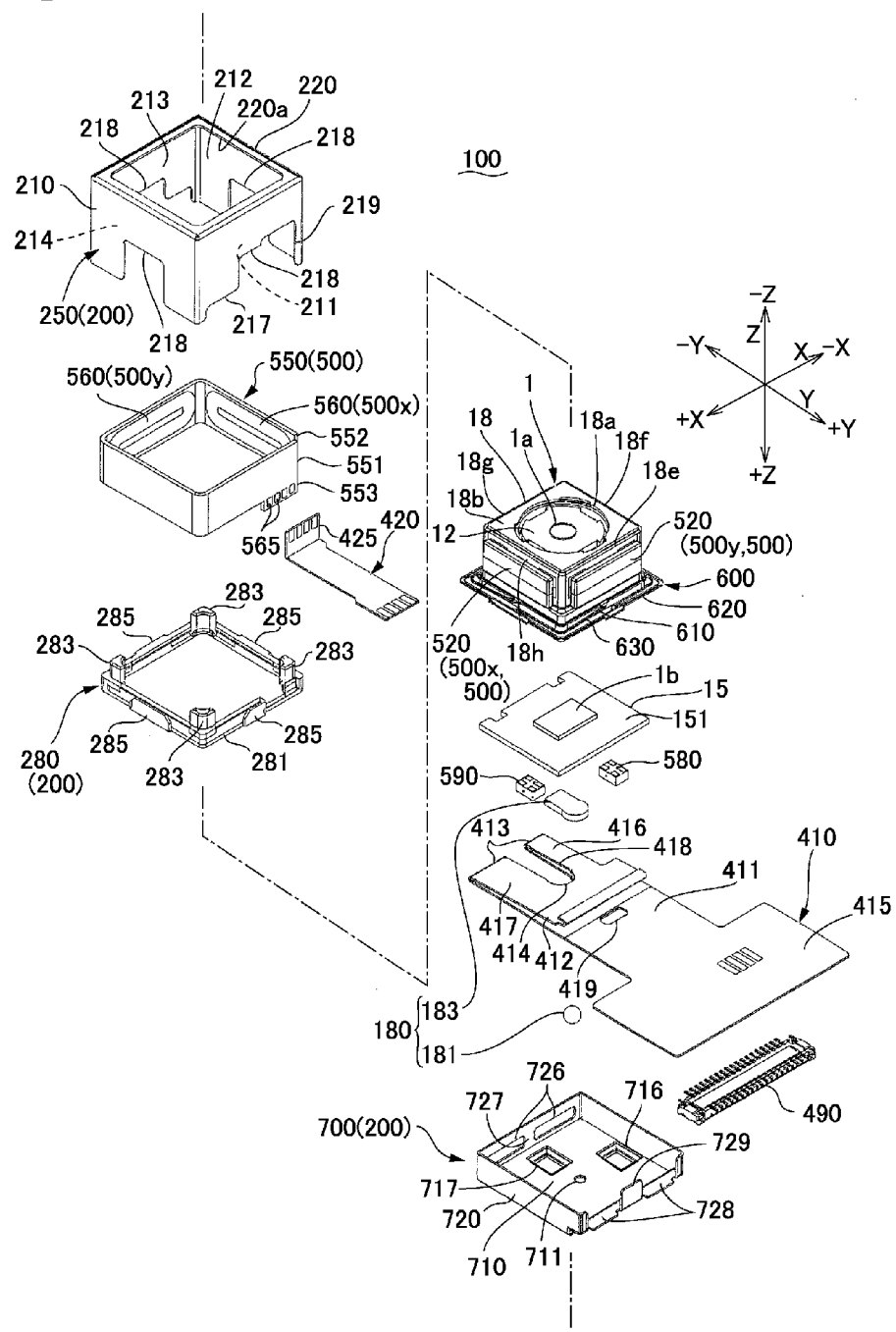
FIG. 9 is an exploded perspective view showing the optical unit with a shake correcting function in accordance with the first embodiment of the present invention which is viewed from an object side.
Figure 10:
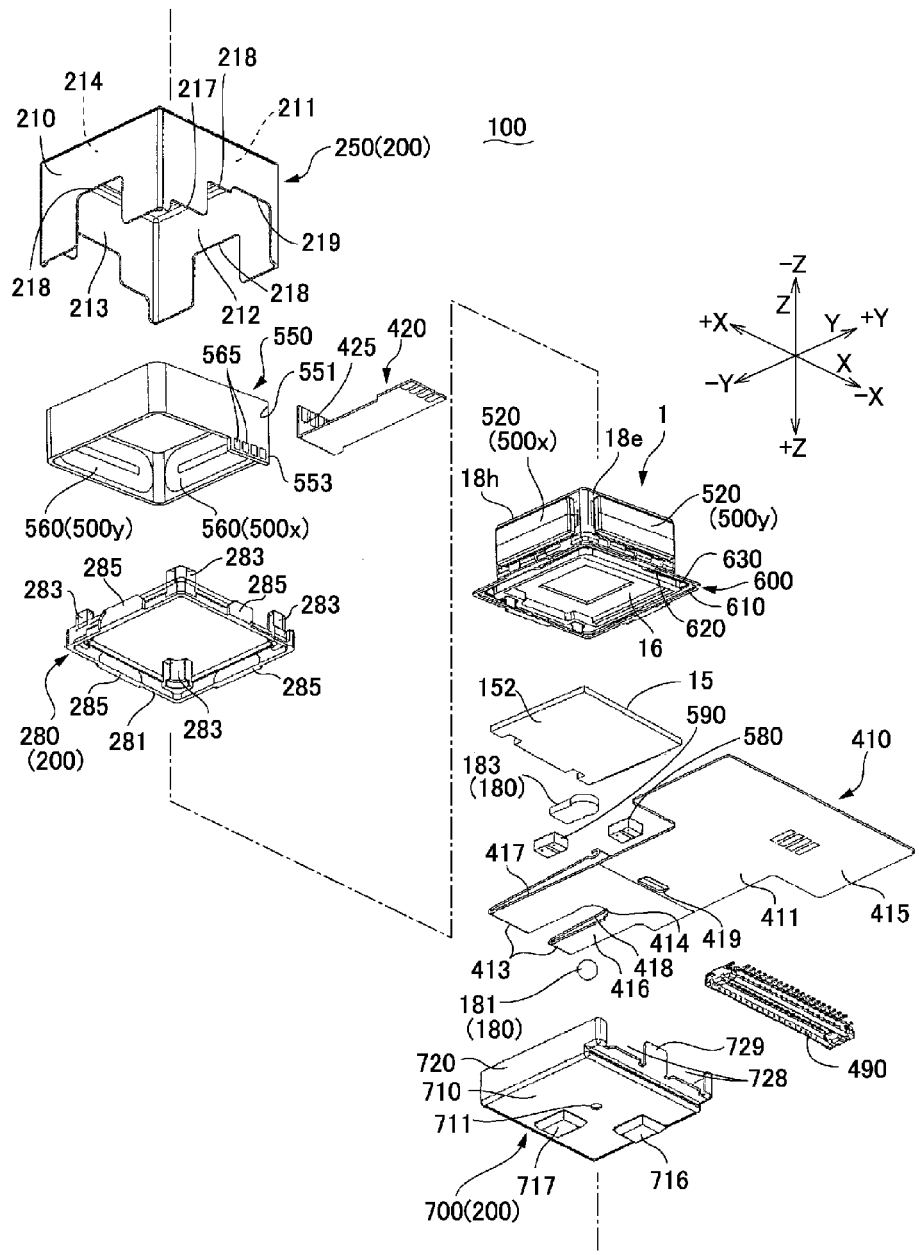
FIG. 10 is an exploded perspective view showing the optical unit with a shake correcting function in accordance with the first embodiment of the present invention which is viewed from an opposite side to the object side.

FIGS. 8(a) and 8(b) are cross-sectional views showing an internal structure of the optical unit 100 with a shake correcting function in accordance with the first embodiment of the present invention. FIG. 8(a) is a "YZ" cross-sectional view of the optical unit 100 and FIG. 8(b) is an "XZ" cross-sectional view of the optical unit 100. In FIGS. 8(a) and 8(b), only the case 18, the board holder 16 and the mounting board 15 of the photographing unit 1 are shown and other members are not shown. FIG. 9 is an exploded perspective view showing the optical unit 100 with a shake correcting function which is viewed from an object to be photographed side in accordance with the first embodiment of the present invention. FIG. 10 is an exploded perspective view showing the optical unit 100 with a shake correcting function which is viewed from an opposite side to an object to be photographed side in accordance with the first embodiment of the present invention.

In FIGS. 8(a) and 8(b), and FIGS. 9 and 10, the optical unit 100 includes a fixed body 200, the photographing unit 1, a spring member 600 through which the photographing unit 1 is supported by the fixed body 200 so as to be capable of displacing, and a shake correction drive mechanism 500 which generates a magnetic drive force for relatively displacing the photographing unit 1 with respect to the fixed body 200 between the photographing unit 1 and the fixed body 200. An outer peripheral portion of the photographing unit 1 is structured of the case 18 (see FIG. 7) which is used in the support body 2 in the photographing unit 1.

The fixed body 200 is provided with an upper cover 250, a spacer 280 and a lower cover 700 and the upper cover 250 is provided with a rectangular tube-shaped body part 210 which surrounds the photographing unit 1 and an end plate part 220 which closes an opening part on the object side of the rectangular tube-shaped body part 210. The end plate part 220 is formed with a window 220*a* through which light from an object to be photographed is incident. In the upper cover 250, an end part on the opposite side ("+Z" side) to the object side (side to which the optical axis is extended) of the rectangular tube-shaped body part 210 is formed to be opened. Further, a cut-out portion 219 is formed in the face located on one side "+Y" in the "Y"-axis direction of the rectangular tube-shaped body part 210. The cut-out portion 219 is utilized when a flexible circuit board 420 is to be connected with a terminal part of a sheet-shaped coil 550 described below. Further, cut-out portions 218 which are utilized for engaging with the spacer 280 described below are formed in four faces of the rectangular tube-shaped body part 210. Two of the four cut-out portions 218 located in the "Y"-axis direction are connected with the cut-out portion 219 to structure one cut-out portion. Further, a cut-out portion 217 connected with the cut-out portion 218 is formed at two positions facing in the "Y"-axis direction on the lower end side of the rectangular tube-shaped body part 210. The cut-out portion 217 on one side "+Y" in the "Y"-axis direction is utilized for extending the flexible circuit board 410 to an outer side.

The spacer 280 is provided with a frame part 281 in a quadrangular shape which is sandwiched between the rectangular tube-shaped body part 210 of the upper cover 250 and a lower cover 700, columnar shaped parts 283 which are protruded toward an object side from corner portions of the frame part 281, and engaging protruded parts 285 which are slightly protruded from side portions of the frame part 281 toward outer sides. When the upper cover 250 is fitted to the spacer 280, the engaging protruded part 285 is engaged with the cut-out portion 218 which is cut off in a quadrangular shape in the rectangular tube-shaped body part 210 of the upper cover 250 and, as a result, positioning of the spacer 280 to the upper cover 250 is performed.

The lower cover 700 is a press-worked product made of a metal plate and is provided with a bottom plate part 710 in a substantially rectangular shape and four side plate parts 720 which are stood up toward an object side from an outer circumferential edge of the bottom plate part 710. When the spacer 280 and the upper cover 250 are superposed on the lower cover 700, the frame part 281 of the spacer 280 is sandwiched between the side plate part 720 and the rectangular tube-shaped body part 210 of the upper cover 250.

The side plate part 720 of the lower cover 700 located on one side "+Y" in the "Y"-axis direction is formed with a cut-out portion 728 and a part of the side plate part 720 is left as a plate-shaped projection 729 at a center part of the cut-out portion 728. Further, a window-shaped cut-out portion 726 is formed in the side plate part 720 located on the other side "−Y" in the "Y"-axis direction and a part of the side plate part 720 is left as a crosspiece part 727 at a center part of the cut-out portion 726. The cut-out portion 728 is, as described below, utilized to extend the flexible circuit board 410 to an outer side and the cut-out portion 726 is utilized to prevent a folded-back portion 413 from interfering with the side plate part 720 of the lower cover 700.

A bottom plate part 710 of the lower cover 700 is formed with a hole 711 at its center position and recessed parts 716 and 717 which are recessed in a rectangular shape are formed at a position adjacent to the hole 711 on the other side "−X" in the "X"-axis direction and a position adjacent to the hole 711 on the other side in the "Y"-axis direction. As described below, inner faces of the bottom parts 716*a* and 717*a* of the recessed parts 716 and 717 are a substantially mirror surface and the bottom parts 716*a* and 717*a* are utilized as reflection faces for a first photo reflector 580 and a second photo reflector 590 which are mounted on a circuit board face 152 of the mounting board 15 on an opposite side to an object side.

The lower cover 700 is formed of a metal member which is non-magnetized by heat treatment. Specifically, the lower cover 700 is a metal member in which metal material such as "SUS 304" is performed with a bending work or a drawing work in a predetermined shape. When a bending work or a drawing work is performed on "SUS 304" or the like, a part of austenite is transferred to martensite to provide with a magnetic property. However, in this embodiment, heat treatment is performed on the lower cover 700 after a bending work or a drawing work. Therefore, when the optical unit 100 is to be assembled, attraction between the permanent magnets 520 and the lower cover 700 is prevented. Further, when heat treatment is performed on metal material such as "SUS 304", the reflectivity of the metal material becomes higher and thus the lower cover 700 is provided with a sufficient reflectivity for utilizing as a reflection surface for the first photo reflector 580 and the second photo reflector 590.

(Structure of Swing Support Point)

On one side "+Z" in the "Z"-axis (opposite side to the object side) with respect to the photographing unit 1, a swing support point 180 for swinging the photographing unit 1 is provided between the photographing unit 1 and the lower cover 700 of the fixed body 200. The photographing unit 1 is urged toward the lower cover 700 by the spring member 600 through the swing support point 180. In this embodiment, the swing support point 180 is structured of a steel ball 181, which is positioned by a hole 711 formed in the bottom plate part 710 of the lower cover 700, and a support plate 183 which is fixed to the circuit board face 152 of the mounting board 15. The photographing unit 1 is capable of being swung with an abutted position of the steel ball 181 with the support plate 183 as a swing center.

As described above, in the optical unit 100 with a shake correcting function in this embodiment, as described with reference to FIG. 1(*a*), the swing support point 180 is structured of the abutted portion of the two members (support plate 183 and steel ball 181) in the optical axis direction between the bottom part of the movable module 10 and the bottom part of the fixed body 200. In this embodiment, in the two members (support plate 183 and steel ball 181) which structure the swing support point 180, the support plate 183 is made of elastic material such as rubber.

(Structure of Spring Member 600)

The spring member 600 is a plate-shaped spring member which is provided with a fixed side connecting part 620 sandwiched between the side plate part 720 of the lower cover 700 and the frame part 281 of the spacer 280 in the fixed body 200, a movable side connecting part 610 connected with the photographing unit 1, and a plurality of arm parts 630 which are extended between the movable side connecting part 610 and the fixed side connecting part 620. Both ends of the arm part 630 are respectively connected with the movable side connecting part 610 and the fixed side connecting part 620. In this embodiment, the movable side connecting part 610 of the spring member 600 is fixed to a stepped part 168 which is formed on an outer peripheral side of the board holder 16 on a rear end side of the photographing unit 1. The spring member 600 is made of nonmagnetic metal such as beryllium copper or nonmagnetic SUS steel material and is formed by performing a press working or etching processing using a photo lithography technique on a thin plate having a certain thickness.

In this embodiment, the photographing unit 1 is disposed on an object side with respect to the steel ball 181 in a state that the fixed side connecting part 620 of the spring member 600 is sandwiched between the side plate part 720 of the lower cover 700 and the frame part 281 of the spacer 280 in the fixed body 200. As a result, the photographing unit 1 is set in a state that the photographing unit 1 is pushed up to an object side by the steel ball 181. Therefore, the movable side connecting part 610 of the spring member 600 is set in a state that the movable side connecting part 610 is pushed to the object side with respect to the fixed side connecting part 620 and thus the arm parts 630 of the spring member 600 urges the photographing unit 1 to an opposite side to the object side. Accordingly, the photographing unit 1 is set in a state that the photographing unit 1 is urged toward the bottom plate part 710 of the lower cover 700 through the swing support point 180 by the spring member 600 and thereby the photographing unit 1 is set in a supported state by the fixed body 200 so as to be capable of being swung through the swing support point 180.

(Structure of Shake Correction Drive Mechanism)

As shown in FIGS. 8(*a*) through 10, in the optical unit 100 in this embodiment, the shake correction drive mechanism 500 is structured of a coil part 560 and a permanent magnet 520 for generating a magnetic field interlinking with the coil part 560. Specifically, four outer faces 18*e*, 18*f*, 18*g* and 18*h* of the rectangular tube-shaped body part 18*c* of the case 18 of the photographing unit 1 are fixed with a flat plate-shaped permanent magnet 520 and the coil part 560 is disposed on inner faces 211, 212, 213 and 214 of the rectangular tube-shaped body part 210 of the upper cover 250. The permanent magnet 520 is magnetized so that the pole of its outer side and the pole of its inner side are different from each other. Further, the permanent magnet 520 is comprised of two magnet pieces disposed in the optical axis "L" direction and the magnet pieces are magnetized so that the poles of faces oppositely disposed to the coil part 560 are different from each other in the optical axis direction. Further, the coil part 560 is formed in a quadrangular frame shape and its upper and lower long side portions are utilized as an effective side.

In the permanent magnets 520 and the coil parts 560, the permanent magnets 520 and the coil parts 560 disposed at two positions so as to interpose the photographing unit 1 from both sides in the "Y"-axis direction structure a "Y"-side shake correction drive mechanism 500*y* and, as shown by the arrows "X1" and "X2" in FIG. 8(*a*), the photographing unit 1 is swung with the axial line "X0" extending in the "X"-axis direction passing through the swing support point 180 as a swing center. Further, the permanent magnets 520 and the coil parts 560 disposed at two positions so as to interpose the photographing unit 1 from both sides in the "X"-axis direction structure an "X"-side shake correction drive mechanism 500*x* and, as shown by the arrows "Y1" and "Y2" in FIG. 8(*b*), the photographing unit 1 is swung with the axial line "Y0" extending in the "Y"-axis direction passing through the swing support point 180 as a swing center.

In order to structure the "Y"-side shake correction drive mechanism 500*y* and the "X"-side shake correction drive mechanism 500*x*, in this embodiment, a sheet-shaped coil 550 is used so as to be extended along the four inner faces 211, 212, 213 and 214 of the upper cover 250 and four coil parts 560 are integrally formed in the sheet-shaped coil 550 with a predetermined distance therebetween. Further, when developed, the sheet-shaped coil 550 is provided with a shape extended in a belt shape and is fixed to the four inner faces 211, 212, 213 and 214 of the upper cover 250 by a method such as surface bonding in a state that the sheet-shaped coil 550 is bent along the inner faces 211, 212, 213 and 214 of the upper cover 250. In this state, both end parts 551 and 552 of the sheet-shaped coil 550 are close to each other through a slit 555.

The sheet-shaped coil 550 is structured so that the coil part 560 made of a minute copper wiring line is formed on a printed circuit board by utilizing an electric conduction wiring technique. A plurality of copper wiring layers (coil part 560) is formed in multi-layer through an insulation film. Further, the surface of the copper wiring line (coil part 560) is covered with an insulation film. For example, an FP coil (fine pattern coil (registered mark)) made by ASAHI KASEI ELECTRONICS CO., LTD. may be used as the sheet-shaped coil 550.

In this embodiment, an end part 551 of the sheet-shaped coil 550 is formed with a protruded part 553 which is protruded in a rectangular shape to an opposite side to the object side and the protruded part 553 is formed with a plurality of terminal parts 565 by utilizing electrically conducting layers extended from the four coil parts 560. In this embodiment, the terminal parts 565 are disposed on an outer side of the sheet-shaped coil 550 which is opposite to the inner side facing the permanent magnet 520. Further, as shown in FIGS. 5(*a*) and 5(*b*), and FIGS. 9 and 10, the cut-out part 219 is formed in the portion of the upper cover 250 which is overlapped with the terminal parts 565. Therefore, since the terminal parts 565 (protruded part 553) of the sheet-shaped coil 550 are exposed to the outer side, the sheet-shaped coil 550 and an end part 425 of the flexible circuit board 420 which is bent toward the direction of the optical axis "L" are electrically connected with each other in the cut-out part 219 by soldering or the like.

In the optical unit 100 which is structured as described above, the photographing unit 1 is supported by the fixed body 200 in a state that the photographing unit 1 is capable of being swung through the swing support point 180. Therefore, when a large force is applied from the outside and thereby the photographing unit 1 is largely swung, the arm parts 630 of the spring member 600 may be plastically deformed. In this embodiment, the sheet-shaped coil 550 and the permanent magnet 520 are faced each other through a narrow gap space. Further, in a case of the sheet-shaped coil 550, different from an air-core coil, a wound coil is not loosened even when the coil is abutted with the permanent magnet 520. Therefore, in the optical unit 100 in this embodiment, moving ranges of the photographing unit 1 in the "X"-axis direction and the "Y"-axis direction intersecting with the optical axis "L" are restricted by abutting of the sheet-shaped coil 550 with the permanent magnet 520 and another stopper mechanism for preventing the swing of the photographing unit 1 is not provided.

Further, in this embodiment, since the sheet-shaped coil 550 is used, in comparison with a case that a single air-core coil is separately used, a distance between the photographing unit 1 and the fixed body 200 can be narrowed and thus the size of the optical unit 100 can be reduced. Further, in a case of the sheet-shaped coil 550, a plurality of coil parts 560 is integrally formed with the terminal parts 565 and thus, even when the coil parts 560 are disposed at plural positions around the optical axis "L", it is sufficient that the sheet-shaped coil 550 is extended around the optical axis "L". Therefore, different from a case that a single air-core coil is separately used, a single air-core coil is not required to be disposed at plural positions around the optical axis "L" and the respective air-core coils are not required to be electrically connected and thus, according to this embodiment, assembly man-hours are reduced. Further, the terminal part 565 of the sheet-shaped coil 550 is disposed so as to face the outer side which is an opposite side to a side facing the permanent magnet 520 and thus electrical connection with the coil parts 560, in other words, connection of the flexible circuit board 420 with the terminal part 565 can be performed easily.

(Shake Correcting Operation)

In the optical unit 100 in this embodiment, when the optical device 1000 shown in FIG. 4 is shaken, the shake is detected by a gyroscope and the host control section controls the shake correction drive mechanism 500 based on a detection result by the gyroscope. In other words, a drive current for cancelling the shake which is detected by the gyroscope is supplied to the coil parts 560 of the sheet-shaped coil body 550 through the flexible circuit board 410 and the flexible circuit board 420. As a result, the "X"-side shake correction drive mechanism 500x swings the photographing unit 1 around the "Y"-axis with the swing support point 180 as a swing center. Further, the "Y"-side shake correction drive mechanism 500y swings the photographing unit 1 around the "X"-axis with the swing support point 180 as the swing center. Further, when the swing around the "X"-axis and the swing around the "Y"-axis of the photographing unit 1 are combined with each other, the photographing unit 1 is displaced over the entire "XY" plane. Accordingly, all shakes occurred in the optical unit 100 can be corrected surely. When the photographing unit 1 is to be driven, the displacement of the photographing unit 1 is monitored by the first photo reflector 580 and the second photo reflector 590 as described below with reference to FIGS. 11(a) and 11(b) and FIG. 9.

(Structure of Flexible Circuit Board 410)

In the optical unit 100 in this embodiment, one end part of the flexible circuit board 410 is connected with the mounting board 15 of the photographing unit 1. In a case that the photographing unit 1 is to be swung, when the flexible circuit board 410 applies a load to the photographing unit 1, an appropriate swing of the photographing unit 1 may be obstructed.

The main body portion 415 of the flexible circuit board 410 which is located on an outer side of the optical unit 100 is formed in a wide width so as to be capable of mounting a connector 490 and being connected with the flexible circuit board 420. However, a portion of the flexible circuit board 410 which is located on an inner side of the optical unit 100 is formed in two strip-shaped portions 411 whose width dimension is narrower than the main body portion 415. Further, the strip-shaped portion 411 is extended from one side "+Y" in the "Y"-axis direction toward the other side "−Y" and then, the strip-shaped portion 411 is folded back toward the one side "+Y" and, after that, an end part of the strip-shaped portion 411 is folded back along an edge of the mounting board 15 so as to be directed toward the circuit board face on the object side of the mounting board 15 and fixed. Therefore, since the flexible circuit board 410 is provided with the folded-back portion 413 between the main body portion 415 disposed on the outer side and the portion fixed to the mounting board 15 and thus its dimension is long. Accordingly, the strip-shaped portion of the flexible circuit board 410 is capable of following a shake of the photographing unit 1 smoothly and thus a large load is not applied to the photographing unit 1.

Further, the strip-shaped portion 411 of the flexible circuit board 410 is formed at a midway portion in its length direction with a slit 418 which is extended along an extended direction ("Y"-axis direction) of the strip-shaped portion 411 and the midway portion of the strip-shaped portion 411 is divided into two thinner width portions 416 and 417 in a widthwise direction. Therefore, the rigidity of the strip-shaped portion 411 is relaxed. Accordingly, the strip-shaped portion of the flexible circuit board 410 is capable of following a shake of the photographing unit 1 smoothly and thus a large load is not applied to the photographing unit 1.

In this embodiment, the strip-shaped portion 411 of the flexible circuit board 420 is superposed on the photographing unit 1 in the optical axis "L" direction. However, the portion of the strip-shaped portion 411 which is superposed on the swing support point 180 is formed with a circular hole 414 connected with the slit 418. Therefore, even when the strip-shaped portion 411 of the flexible circuit board 420 is disposed at a position superposed on the photographing unit 1 in the optical axis "L" direction, the swing support point 180 is provided without a problem.

Further, in the side plate part 720 of the lower cover 700, the side plate part 720 located on one side "+Y" in the "Y"-axis direction is formed with the cut-out portion 728 for extending the strip-shaped portion 411 of the flexible circuit board 420 and a part of the side plate part 720 is left as a plate-shaped projection 729 at the center part of the cut-out portion 728. However, a hole 419 in an elliptic shape is formed in a portion of the strip-shaped portion 411 of the flexible circuit board 420 which is superposed on the plate-shaped projection 729. Therefore, when the strip-shaped portion 411 of the flexible circuit board 420 is extended to an outer side through the cut-out portion 728 of the side plate part 720, the plate-shaped projection 729 is inserted into the hole 419 and thus the strip-shaped portion 411 of the flexible circuit board 420 is extended to the outer side without a problem. Further, since the plate-shaped projection 729 is fitted to the hole 419, positioning of the strip-shaped portion 411 of the flexible circuit board 420 is performed.

In addition, in the side plate part 720 of the lower cover 700, the side plate part 720 located on the other side "−Y" in the "Y"-axis direction is formed with the cut-out portion 726 in a window shape. Therefore, even when the folded-back portion 413 of the flexible circuit board 410 is located in the vicinity of the side plate part 720, the folded-back portion 413 and the side plate part 720 are not interfered with each other. Accordingly, when the photographing unit 1 is swung, an unnecessary load due to interference of the folded-back portion 413 with the side plate part 720 is not applied to the photographing unit 1.

In addition, the folded-back portion 413 of the flexible circuit board 410 is located at the same height position as the swing center (abutting position of the steel ball 181 with the support plate 183) of the photographing unit 1 in the swing support point 180. Therefore, when the photographing unit 1 is swung, the displacement of the strip-shaped portion 411 is restrained small.

(Structure of Photo Reflector)

Figure 11A:
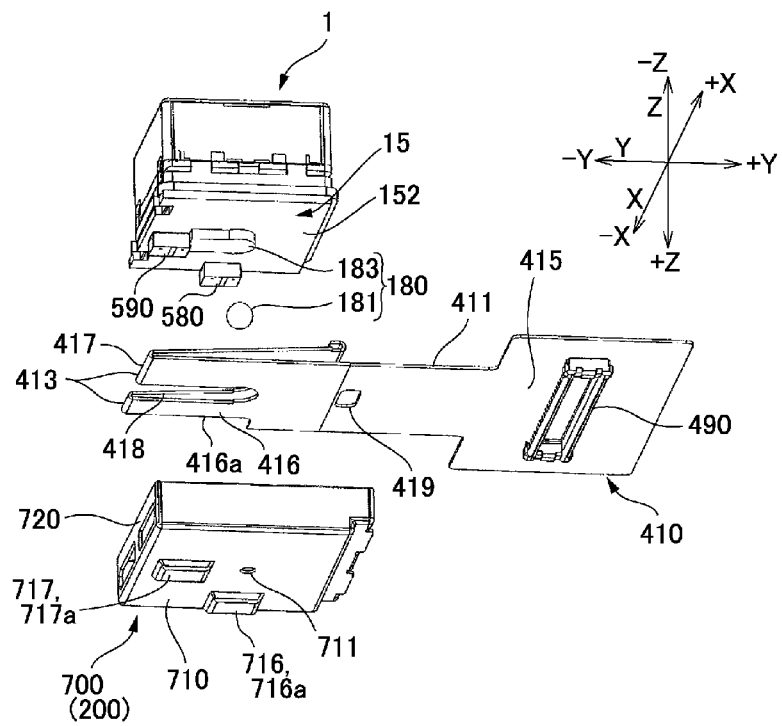
FIGS. 11(a) and 11(b) are explanatory views showing photo reflectors which are provided in the optical unit with a shake correcting function in accordance with the first embodiment of the present invention.
Figure 11B:
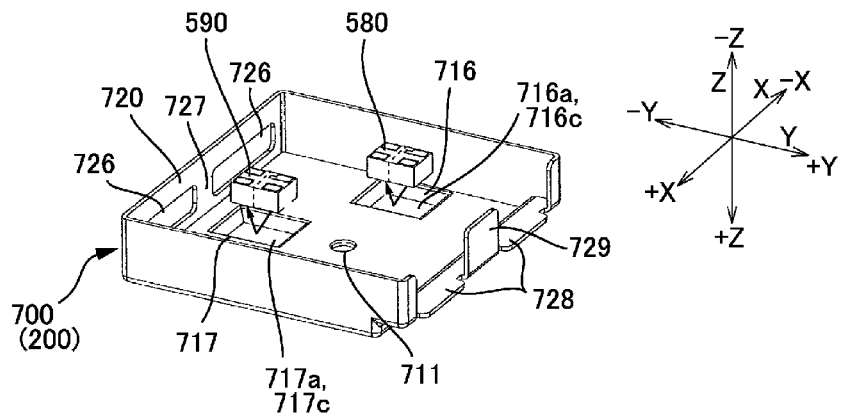
Figure 12A:
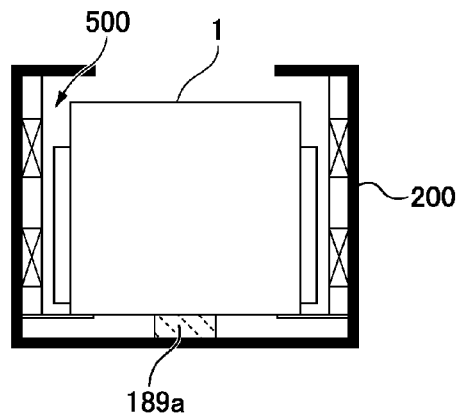
FIGS. 12(a), 12(b) and 12(c) are explanatory views showing a conventional optical unit with a shake correcting function.
Figure 12B:
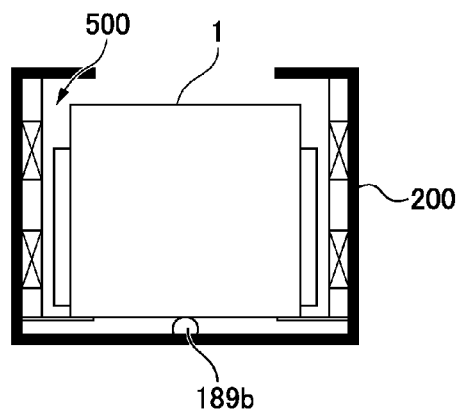
Figure 12C:
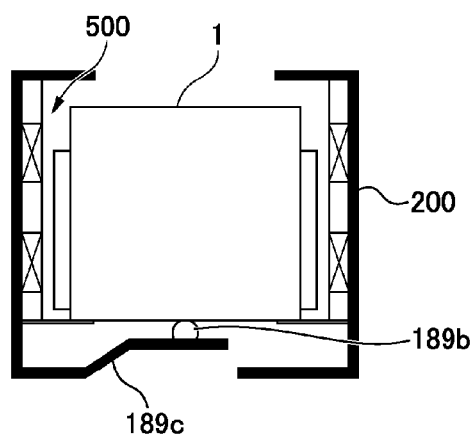

FIGS. 11(a) and 11(b) are explanatory views showing photo reflectors which are provided in the optical unit 100 with a shake correcting function in accordance with the first embodiment of the present invention. FIG. 11(a) is an exploded perspective view showing an opposite side portion of the optical unit 100 to the object side and FIG. 11(b) is an explanatory view showing a positional relationship between the photo reflectors and reflection faces.

As shown in FIG. 8(a) through FIG. 11(b), in the optical unit 100 with a shake correcting function in this embodiment, the swing support point 180 is structured between the mounting board 15 which structures the bottom part of the photographing unit 1 and the lower cover 700 of the fixed body 200 and a first photo reflector 580 and a second photo reflector 590 are mounted on the circuit board face 152 of the mounting board 15 facing the lower cover 700. Further, two recessed parts 716 and 717 are formed in the bottom plate part 710 of the lower cover 700 and inner faces of the bottom parts 716a and 717a of the recessed parts 716 and 717 are a first reflection part 716c and a second reflection part 717c for the first photo reflector 580 and the second photo reflector 590. In this embodiment, each of the first photo reflector 580 and the second photo reflector 590 is formed in a rectangular planar shape when viewed in the optical axis "L" direction and each of the first photo reflector 580 and the second photo reflector 590 is provided with a light emitting part at an end part on one side in the longitudinal direction and a light receiving part at an end part on the other side in the longitudinal direction. Further, in the first photo reflector 580 and the second photo reflector 590, a light intercepting part is formed between the light emitting part and the light receiving part.

In this embodiment, the first photo reflector 580 is disposed at a position superposing the axial line "X0" in the optical axis "L" direction described with reference to FIG. 8(b) and the light emission center and the light reception center of the first photo reflector 580 are disposed at a linear symmetrical position with respect to the axial line "X0" in the direction perpendicular to the optical axis "L". Further, the second photo reflector 590 is disposed at a position superposing the axial line "Y0" in the optical axis "L" direction described with reference to FIG. 8(a) and the light emission center and the light reception center of the second photo reflector 590 are superposed on the axial line "Y0" in the optical axis "L" direction.

Further, the first photo reflector 580 and the second photo reflector 590 are disposed so that their long sides are extended in the "Y"-axis direction and are parallel to the extended direction of the strip-shaped portion 411 of the flexible circuit board 410. Therefore, the short sides of the first photo reflector 580 and the second photo reflector 590 are extended in the widthwise direction of the flexible circuit board 410. Accordingly, even when the second photo reflector 590 is disposed at a position superposed on the slit 418 of the flexible circuit board 410 so that the second photo reflector 590 and the flexible circuit board 410 are not superposed on each other in the optical axis "L" direction, the width dimension of the slit 418 is not required to be increased. Further, in the strip-shaped portion 411 of the flexible circuit board 410, even in a case that a cut-out portion 416a is formed on an outer side edge portion of the thinner width portion 416 and the first photo reflector 580 is disposed at a position superposed on the cut-out portion 416a so that the first photo reflector 580 and the flexible circuit board 410 are disposed so as not to superpose on each other in the optical axis "L" direction, a width dimension of the cut-out portion 416a can be narrowed. Therefore, even when the strip-shaped portion 411 of the flexible circuit board 410 is extended in the "Y"-axis direction so as to avoid the position superposed on the first photo reflector 580 and the second photo reflector 590 in the optical axis "L" direction between the bottom part (mounting board 15) of the photographing unit 1 and the lower cover 700 of the fixed body 200, the width dimension of the strip-shaped portion 411 is comparatively large.

In the first photo reflector 580 and the second photo reflector 590 structured as described above, in a state that the mounting board 15 and the bottom plate part 710 of the lower cover 700 are parallel to each other, as shown in FIG. 11(b), light emitted from the light emitting part of the photo reflector 580 is reflected by the first reflection part 716c to be received by the light receiving part of the first photo reflector 580 with a high intensity and light emitted from the light emitting part of the second photo reflector 590 is reflected by the second reflection part 717c to be received by the light receiving part of the second photo reflector 590 with a high intensity. On the other hand, in a state that the mounting board 15 and the bottom plate part 710 of the lower cover 700 are not parallel to each other, light-receiving intensity in the light receiving part of the first photo reflector 580 and light-receiving intensity in the light receiving part of the second photo reflector 590 are lowered. Further, the light-receiving intensity in the light receiving part of the first photo reflector 580 and the light-receiving intensity in the light receiving part of the second photo reflector 590 are varied according to a direction of inclination of the photographing unit 1 with respect to the fixed body 200. Therefore, inclination of the photographing unit 1 is detected when the photographing unit 1 is swung around the axial lines "X0" and "Y0" for correcting a shake in hand in the optical unit 1. Accordingly, the swing of the photographing unit 1 by the shake correction drive mechanism 500 is appropriately performed by utilizing the detection result.

In this embodiment, the first photo reflector 580 is disposed at a position superposed on the axial line "X0" in the optical axis "L" direction and the second photo reflector 590 is disposed at a position superposed on the axial line "Y0" in the optical axis "L" direction. Therefore, displacement in the "Z"-axis direction of the photographing unit 1 is monitored by the detection result of the first photo reflector 580 when the photographing unit 1 is turned around the axial line "Y0". Further, displacement in the "Z"-axis direction of the photographing unit 1 is monitored by the detection result of the second photo reflector 590 when the photographing unit 1 is turned around the axial line "X0". Therefore, displacement of the photographing unit 1 when turned around the axial line "X0" and displacement of the photographing unit 1 when turned around the axial line "Y0" are independently monitored and thus the turning around the axial line "X0" of the photographing unit 1 and the turning around the axial line "Y0" are controlled independently.

(Principal Effects in this Embodiment)

As described above, in the optical unit 100 in this embodiment, the shake correction drive mechanism 500 for swinging the photographing unit 1 as a movable module is provided and thus, when a shake such as a shake in hand occurs in the optical unit 100, the photographing unit 1 can be swung to cancel the shake. Therefore, even when the optical unit 100 is shaken, inclination of the optical axis "L" can be corrected.

Further, in the optical unit 100 with a shake correcting function in this embodiment, the swing support point 180 is utilized which is structured of an abutted portion of two members (support plate 183 and steel ball 181) abutted in the optical axis direction between the bottom part of the movable module 10 and the bottom part of the fixed body 200. Therefore, when the movable module 10 is swung, the member structuring the swing support point 180 is not required to be deformed. Accordingly, the movable module 10 is swung by a small force. Further, in this embodiment, in the two members (support plate 183 and steel ball 181) which structure the swing support point 180, the support plate 183 is made of elastic material and thus, when an impact is applied, the impact can be absorbed by the support plate 183 which is made of elastic material. Further, in a case that the member (support plate 183) is made of elastic material, different from a spring, vibration energy is converted into thermal energy and absorbed. Therefore, resonance is hard to be occurred between the movable module 10 and the fixed body 200. Accordingly, a state that a relative positional relationship between the movable module 10 and the fixed body 200 continues to vary by the resonance is capable of being avoided and thus, in a case that a servo control is performed, even when a control gain is increased, the control system is prevented from being oscillated. For example, even when displacement of the movable module 10 is detected by the first photo reflector 580 and the second photo reflector 590 between the bottom part of the movable module 10 and the bottom part of the fixed body 200 and the shake correction drive mechanism 500 is controlled on the basis of the detection result, the effects which are described with reference to FIG. 1(a) are attained, for example, the shake correction drive mechanism 500 is controlled appropriately.

Further, in this embodiment, the folded-back portion 413 of the flexible circuit board 410 is located at the same height position as the swing center (abutted position of the steel ball 181 with the support plate 183) of the photographing unit 1 in the swing support point 180. Therefore, displacement of the strip-shaped portion 411 can be restrained small when the photographing unit 1 is swung. Accordingly, influence of the flexible circuit board 410 to the photographing unit 1 can be reduced and thus photographing unit 1 is swung with a high degree of accuracy.

In addition, the shake correction drive mechanism 500 is provided between the outer peripheral face of the photographing unit 1 and the fixed body 200 (upper cover 250), and the first photo reflector 580 and the second photo reflector 590 is provided by utilizing a space between the bottom part (mounting board 15) of photographing unit 1 and the fixed body 200 (lower cover 700) where the swing support point 180 is provided. Therefore, even when the photo reflector (first photo reflector 580 and second photo reflector 590), the swing support point 180 and the shake correction drive mechanism 500 are provided with respect to the photographing unit 1, increase of the size in the optical axis "L" direction and the direction intersecting the optical axis direction ("X"-axis direction and "Y"-axis direction) can be restrained.

[Other Embodiments]

In the embodiments described above, the present invention is, as an example, applied to the optical unit 100 which is used in a cell phone with a camera. However, at least an embodiment of the present invention may be applied to the optical unit 100 which is used in a thin type digital camera or the like. Further, in the embodiment described above, the lens drive mechanism 5 which magnetically drives the movable body 3 including the photographing unit 1 having the lens 1a and the imaging element 1b in the optical axis direction is supported on the support body 2. However, the present invention may be applied to a fixed focus type optical unit in which the lens drive mechanism 5 is not mounted on the photographing unit 1.

In addition, other than a cell phone, a digital camera and the like, the optical unit 100 with a shake correcting function to which at least an embodiment of the present invention is applied may be fixed in an apparatus such as a refrigerator in which vibration is occurred in a certain interval and mounted so as to be capable of being remote controlled. According to the apparatus, a service can be provided in which information in the inside of the refrigerator is obtained at a visit place, for example, at the time of shopping. According to this service, since the camera system is provided with an attitude stabilizing device, a stable image can be transmitted even when vibration may occur in the refrigerator. Further, this device may be fixed to a device such as a bag, a satchel or a cap of a child and a student which is carried at a time of commuting or attending school. In this case, states of surroundings are photographed at a constant interval and, when the image is transmitted to a predetermined server, the parent or the like watches the image at a remote place to secure security of the child. In this application, without conscious of a camera, a clear image is photographed even when vibration occurs at the time of moving. Further, when a GPS is mounted in addition to a camera module, the position of a target person can be obtained simultaneously and thus, when an accident occurs, its position and situation can be confirmed immediately. In addition, when the optical unit 100 with a shake correcting function to which at least an embodiment of the present invention is applied is mounted at a position which is capable of photographing toward a front side in a car, it can be used as a drive recorder. Further, it may be structured that the optical unit 100 with a shake correcting function to which at least an embodiment of the present invention is applied is mounted at a position which is capable of photographing toward a front side in a car and a front side image is photographed automatically at a constant interval, which is automatically transmitted to a predetermined server. Further, when this image is distributed while interlocking with traffic jam information in the VICS (Vehicle Information and Communication System) of a car navigation system, the situation of a traffic jam can be provided further in detail. According to this service, similarly to a drive recorder mounted on a car, the situation when an accident has occurred can be recorded by a third person of passer-by without intention to utilize an inspection of the situation. Further, a clear image can be acquired without affected by vibration of a car. In a case of the application, when a power supply is turned on, a command signal is outputted to the control section and the shake control is started on the basis of the command signal.

Further, the optical unit 100 with a shake correcting function to which at least an embodiment of the present invention is applied may be applied to shake correction of an optical device from which a light beam is emitted such as a laser beam pointer, a portable or on-vehicle projection display device and direct viewing type display device. Further, in an observation system with a high magnification such as an astronomical telescope system or a binocular system, the optical unit 100 may be used to observe without using an auxiliary locking device such as three-legged supports. In addition, when at least an embodiment of the present invention is applied to a rifle or a turret of a tank, its attitude can be stabilized against vibration at the time of trigger and thus hitting accuracy can be enhanced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. An optical unit with a shake correcting function comprising:
   a fixed body;
   a movable module which holds an optical element;
   a swing support point which swingably supports the movable module; and
   a shake correction drive mechanism structured to swing the movable module with the swing support point as a swing center;

wherein the swing support point is structured of an abutted portion of two members in an optical axis direction between a bottom part of the movable module and a bottom part of the fixed body; and wherein at least one of the two members is made of elastic material;

wherein one of the two members is abutted with the other member through a portion which is curved in a projected shape and thereby the abutted portion is structured;

wherein only one of the two members is made of elastic material;

wherein the elastic material is one of rubber and porous elastomer.

2. The optical unit with a shake correcting function according to claim 1, further comprising a spring member which is provided between the movable module and the fixed body for urging the movable module toward the bottom part of the fixed body.

3. The optical unit with a shake correcting function according to claim 1, further comprising a photo reflector which is provided between the bottom part of the movable module and the bottom part of the fixed body for detecting displacement of the movable module with respect to the fixed body, wherein the shake correction drive mechanism is controlled on a basis of a detection result of the reflector.

4. The optical unit with a shake correcting function according to claim 1, further comprising a flexible circuit board which is connected with the movable module, wherein the flexible circuit board is provided with a folded-back portion which is turned around at a same height position in the optical axis direction as a swing center of the movable module in the swing support point between the bottom part of the movable module and the bottom part of the fixed body.

5. The optical unit with a shake correcting function according to claim 1, wherein the shake correction drive mechanism includes four permanent magnets which are formed in a flat plate shape and are respectively fixed to four outer faces of a case having a rectangular tube-shaped body part structuring the movable module, and four coil parts which are disposed on four inner faces of a cover having a rectangular tube-shaped body part structuring the fixed body, and the movable module is swung by the four permanent magnets and the four coil parts with the swing support point as a swing center.

6. The optical unit with a shake correcting function according to claim 1, wherein the portion structuring the abutted portion which is curved in the projected shape is formed in a spherical shape, and an abutting face of the other member which is abutted with a tip end of the spherical shape is formed in a flat face.

7. The optical unit with a shake correcting function according to claim 6, wherein the movable module is provided with a lens and an imaging element as the optical element, the bottom part of the movable module is structured of a mounting board on which the imaging element is mounted, the swing support point is structured of a steel ball, which is positioned by a hole formed in the bottom part of the fixed body, and a support plate which is fixed to a board face of the mounting board on which the imaging element is mounted, and the support plate is structured of the elastic material and is formed so that its abutting face which is abutted with the steel ball is a flat face.

8. The optical unit with a shake correcting function according to claim 7, further comprising a plate-shaped spring member which is provided with a fixed side connecting part connected with the fixed body, a movable side connecting part connected with the movable module, and a plurality of arm parts which are extended between the fixed side connecting part and the movable side connecting part, and the plate-shaped spring member being structured to urge the movable module toward the swing support point, and wherein the steel ball and the flat face of the support plate which is structured of the elastic material are abutted with each other by the plate-shaped spring member.

9. The optical unit with a shake correcting function according to claim 8, wherein the shake correction drive mechanism includes four permanent magnets which are formed in a flat plate shape and are respectively fixed to four outer faces of a case having a rectangular tube-shaped body part structuring the movable module, and four coil parts which are disposed on four inner faces of a cover having a rectangular tube-shaped body part structuring the fixed body, and the movable module is swung by the four permanent magnets and the four coil parts with the swing support point, which is structured of the steel ball and the flat face of the support plate, as a swing center.

10. The optical unit with a shake correcting function according to claim 8, further comprising a photo reflector which is mounted on the mounting board of the movable module for detecting displacement of the movable module with respect to the fixed body, wherein the shake correction drive mechanism is controlled on a basis of a detection result of the photo reflector.

11. The optical unit with a shake correcting function according to claim 8, further comprising a flexible circuit board which is connected with the mounting board of the movable module, wherein the flexible circuit board is provided with a folded-back portion which is turned around at a same height position in the optical axis direction as a swing center of the movable module in the swing support point between the mounting board of the movable module and the bottom part of the fixed body.

* * * * *